(12) United States Patent
Rivers et al.

(10) Patent No.: US 7,826,184 B2
(45) Date of Patent: Nov. 2, 2010

(54) SERIES ARC FAULT INTERRUPTERS AND METHODS

(75) Inventors: Cecil Rivers, Hartford, CT (US);
Weizhong Yan, Clifton Park, NY (US);
Yingneng Zhou, Niskayuna, NY (US);
Xiao Hu, Schenectady, NY (US); Sean Dwyer, Milford, CT (US); Pradeep Vijayan, Bangalore (IN); Vijaysai Prasad, Bangalore (IN); Karim Younsi, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/290,246

(22) Filed: Oct. 29, 2008

(65) Prior Publication Data
US 2009/0059449 A1   Mar. 5, 2009

Related U.S. Application Data

(63) Continuation of application No. 11/646,733, filed on Dec. 28, 2006, now Pat. No. 7,463,465.

(51) Int. Cl.
*H02H 3/16* (2006.01)
(52) U.S. Cl. .......................................... 361/42; 361/44
(58) Field of Classification Search .............. 361/42–50
See application file for complete search history.

(56) References Cited

U.S. PATENT DOCUMENTS 4,514,709 A   4/1985   Nakano et al. .............. 335/201

(Continued)

FOREIGN PATENT DOCUMENTS

AU   5878700 A   1/2001

(Continued)

OTHER PUBLICATIONS

Al-Dabbagh,et al., "Improved Microprocessor Based Distribution Feeder Earth Fault Protection Using Pattern Recognition"; *Proceedings of the Fourth International Conference on Development in Power Protection*, 1989, pp. 172-179 (downloaded from IEEE Xplore, Oct. 14, 2008).

(Continued)

*Primary Examiner*—Danny Nguyen
(74) *Attorney, Agent, or Firm*—Ohlandt, Greeley, Ruggiero & Perle, L.L.P.

(57) ABSTRACT

A circuit interrupter for interrupting current on a line conductor is provided. The circuit interrupter includes separable contacts, a trip mechanism, a bimetal, a microprocessor, a series arc detection sequence, a low-pass filter circuit, and a high-pass filter circuit. The trip mechanism selectively opens the separable contacts when activated. The series arc detection sequence is resident on the microprocessor and includes a plurality of series fault detection algorithms. The low-pass filter circuit provides a low-pass signal to the series arc detection sequence. The high-pass filter circuit provides a high-pass signal to the series arc detection sequence. The sequence selects a particular algorithm from the plurality of algorithms based on the low-pass signal. The sequence calculates a plurality of statistical features from the high-pass signal and sends an output signal to activate the trip mechanism based on a comparison of the plurality of statistical features to the particular algorithm.

19 Claims, 7 Drawing Sheets

U.S. PATENT DOCUMENTS

| | | | |
|---|---|---|---|
| 5,185,684 A | 2/1993 | Beihoff et al. | 361/45 |
| 5,185,685 A | 2/1993 | Tennies et al. | 361/45 |
| 5,185,686 A | 2/1993 | Hansen et al. | 361/45 |
| 5,185,687 A | 2/1993 | Beihoff et al. | 361/45 |
| 5,208,542 A | 5/1993 | Tennies et al. | 324/544 |
| 5,223,795 A | 6/1993 | Blades | |
| 5,434,509 A | 7/1995 | Blades | |
| 5,452,223 A | 9/1995 | Zuercher et al. | 364/483 |
| 5,485,093 A | 1/1996 | Russell et al. | 324/522 |
| 5,506,789 A | 4/1996 | Russell et al. | 364/492 |
| 5,512,832 A | 4/1996 | Russell et al. | 324/522 |
| 5,550,751 A | 8/1996 | Russell | 364/492 |
| 5,561,605 A | 10/1996 | Zuercher et al. | 364/483 |
| 5,578,931 A | 11/1996 | Russell et al. | 324/536 |
| 5,600,526 A | 2/1997 | Russell et al. | 361/65 |
| 5,659,453 A | 8/1997 | Russell et al. | 361/93 |
| 5,682,101 A | 10/1997 | Brooks et al. | 324/536 |
| 5,691,869 A | 11/1997 | Engel et al. | 361/42 |
| 5,726,577 A | 3/1998 | Engel et al. | 324/536 |
| 5,729,145 A | 3/1998 | Blades | |
| 5,805,397 A | 9/1998 | MacKenzie | 361/42 |
| 5,815,352 A | 9/1998 | Mackenzie | 361/42 |
| 5,835,321 A | 11/1998 | Elms et al. | 361/45 |
| 5,839,092 A | 11/1998 | Erger et al. | 702/58 |
| 5,933,305 A | 8/1999 | Schmalz et al. | 361/42 |
| 5,969,920 A | 10/1999 | Mackenzie | 361/42 |
| 5,982,593 A | 11/1999 | Kimblin et al. | 361/42 |
| 5,986,860 A | 11/1999 | Scott | |
| 6,031,699 A | 2/2000 | Dollar, II et al. | 361/42 |
| 6,052,046 A | 4/2000 | Ennis et al. | 335/202 |
| 6,128,170 A | 10/2000 | Daum | 361/42 |
| 6,191,589 B1 | 2/2001 | Clunn | 324/424 |
| 6,195,241 B1 | 2/2001 | Brooks et al. | 361/42 |
| 6,198,611 B1 | 3/2001 | Macbeth | 361/42 |
| 6,232,857 B1 | 5/2001 | Mason, Jr. et al. | 335/18 |
| 6,239,962 B1 | 5/2001 | Seymour et al. | 361/115 |
| 6,255,923 B1 | 7/2001 | Mason, Jr. et al. | 335/18 |
| 6,259,996 B1 | 7/2001 | Haun et al. | 702/58 |
| D450,660 S | 11/2001 | Seymour et al. | D13/160 |
| 6,313,642 B1 | 11/2001 | Brooks | 324/547 |
| 6,362,628 B2 | 3/2002 | MacBeth et al. | |
| 6,373,257 B1 | 4/2002 | Macbeth et al. | 324/536 |
| 6,377,055 B1 | 4/2002 | Macbeth et al. | 324/522 |
| 6,388,849 B1 | 5/2002 | Rae | 361/42 |
| 6,414,829 B1 | 7/2002 | Haun et al. | 361/42 |
| 6,417,671 B1 | 7/2002 | Tiemann | 324/509 |
| 6,426,632 B1 | 7/2002 | Clunn | 324/509 |
| 6,459,273 B1 | 10/2002 | Dollar, II et al. | 324/536 |
| 6,504,692 B1 | 1/2003 | Macbeth et al. | 361/42 |
| 6,522,228 B2 | 2/2003 | Wellner et al. | 335/18 |
| 6,522,509 B1 | 2/2003 | Engel et al. | 361/42 |
| 6,532,129 B1 | 3/2003 | Sri-Jayantha et al. | 360/77.02 |
| 6,532,139 B2 | 3/2003 | Kim et al. | |
| 6,538,863 B1 | 3/2003 | Macbeth | 361/42 |
| 6,542,056 B2 | 4/2003 | Nerstrom et al. | 335/17 |
| 6,545,574 B1 | 4/2003 | Seymour et al. | 335/18 |
| 6,556,397 B2 | 4/2003 | Kim et al. | 361/42 |
| 6,570,392 B2 | 5/2003 | Macbeth et al. | 324/536 |
| 6,590,754 B1 | 7/2003 | Macbeth | 361/42 |
| 6,608,741 B1 | 8/2003 | Macbeth | 361/42 |
| 6,621,669 B1 | 9/2003 | Haun et al. | 361/42 |
| 6,625,550 B1 | 9/2003 | Scott et al. | 702/58 |
| 6,628,487 B1 | 9/2003 | Macbeth | 361/42 |
| 6,633,467 B2 | 10/2003 | Macbeth et al. | 361/42 |
| 6,642,832 B2 | 11/2003 | Pellon et al. | 337/66 |
| 6,654,219 B1 | 11/2003 | Romano et al. | 361/78 |
| 6,678,137 B1 | 1/2004 | Mason, Jr. et al. | 361/103 |
| 6,703,842 B2 | 3/2004 | Itimura et al. | 324/544 |
| 6,707,651 B2 | 3/2004 | Elms et al. | 361/42 |
| 6,720,872 B1 | 4/2004 | Engel et al. | 340/514 |
| 6,777,953 B2 | 8/2004 | Blades | 324/532 |
| 6,798,628 B1 | 9/2004 | Macbeth | 361/42 |
| 6,833,713 B2 | 12/2004 | Schoepf et al. | 324/536 |
| 6,839,208 B2 | 1/2005 | Macbeth et al. | 361/42 |
| 6,876,203 B2 | 4/2005 | Blades | 324/536 |
| 6,882,158 B2 | 4/2005 | Blades | 324/536 |
| 6,927,579 B2 | 8/2005 | Blades | 324/536 |
| 6,927,597 B2 | 8/2005 | Kliman et al. | |
| 6,972,937 B1 * | 12/2005 | Macbeth et al. | 361/42 |
| 6,980,407 B2 | 12/2005 | Kawate et al. | 361/42 |
| 6,999,289 B2 | 2/2006 | Macbeth et al. | 361/5 |
| 7,009,406 B2 | 3/2006 | Naidu et al. | |
| 7,062,388 B2 | 6/2006 | Rivers et al. | |
| 7,069,116 B2 | 6/2006 | Kunsman et al. | |
| 7,106,069 B2 | 9/2006 | Kim et al. | |
| 7,136,265 B2 | 11/2006 | Wong et al. | |
| 7,148,696 B2 | 12/2006 | Zhou et al. | |
| 7,151,656 B2 | 12/2006 | Dvorak et al. | |
| 7,205,772 B2 | 4/2007 | Naidu et al. | |
| 7,253,637 B2 | 8/2007 | Dvorak et al. | |
| 7,359,168 B2 | 4/2008 | Elms et al. | |
| 7,362,553 B2 | 4/2008 | Elms et al. | |
| 7,391,218 B2 | 6/2008 | Kojori et al. | |
| 7,403,129 B2 | 7/2008 | Zhou et al. | |
| 7,409,303 B2 | 8/2008 | Yeo et al. | |
| 7,463,465 B2 | 12/2008 | Rivers, Jr. et al. | |
| 2001/0033469 A1 | 10/2001 | MacBeth et al. | |
| 2001/0036047 A1 | 11/2001 | MacBeth et al. | |
| 2002/0033701 A1 | 3/2002 | MacBeth et al. | |
| 2002/0038199 A1 | 3/2002 | Blemel | |
| 2002/0051546 A1 | 5/2002 | Bizjak | |
| 2002/0080003 A1 | 6/2002 | Pellon et al. | |
| 2002/0085327 A1 | 7/2002 | Kim et al. | |
| 2002/0097056 A1 | 7/2002 | Blades | |
| 2002/0130668 A1 | 9/2002 | Blades | |
| 2002/0196031 A1 | 12/2002 | Blades | |
| 2003/0072113 A1 | 4/2003 | Wong et al. | |
| 2003/0074148 A1 | 4/2003 | Dvorak et al. | |
| 2003/0098982 A1 | 5/2003 | McLeod et al. | |
| 2003/0201780 A1 | 10/2003 | Blades | |
| 2003/0205460 A1 | 11/2003 | Buda | |
| 2004/0043255 A1 | 3/2004 | Horai et al. | |
| 2004/0095695 A1 | 5/2004 | Kim et al. | |
| 2004/0100274 A1 | 5/2004 | Gloster et al. | |
| 2004/0150410 A1 | 8/2004 | Schoeqf et al. | |
| 2004/0172207 A1 | 9/2004 | Hancock et al. | |
| 2004/0182697 A1 | 9/2004 | Buda | |
| 2005/0207083 A1 | 9/2005 | Rivers et al. | |
| 2005/0264962 A1 | 12/2005 | Kim et al. | |
| 2006/0015703 A1 | 1/2006 | Ramchandran et al. | |
| 2006/0164097 A1 | 7/2006 | Zhou et al. | |
| 2006/0203401 A1 | 9/2006 | Kojori et al. | 361/42 |
| 2006/0214670 A1 | 9/2006 | Naidu et al. | |
| 2006/0279883 A1 | 12/2006 | Elms et al. | |
| 2007/0057678 A1 | 3/2007 | Dvorak et al. | |
| 2007/0086124 A1 | 4/2007 | Elms et al. | |
| 2007/0260346 A1 | 11/2007 | Ganesan et al. | |
| 2007/0263329 A1 | 11/2007 | Zhou et al. | |
| 2008/0238404 A1 | 10/2008 | Ferguson | |
| 2009/0088988 A1 | 4/2009 | Muthu-Mannivannan et al. | |

FOREIGN PATENT DOCUMENTS

| | | |
|---|---|---|
| CA | 2248924 A1 | 3/1998 |
| CA | 2334134 A1 | 8/2001 |
| CA | 2336769 A1 | 8/2001 |
| CA | 2337446 A1 | 8/2001 |
| CA | 2307172 A1 | 10/2001 |
| CA | 2549709 A1 | 12/2006 |
| EP | 1126572 A2 | 8/2001 |
| EP | 1126572 A3 | 10/2005 |
| EP | 1329733 B1 | 5/2006 |
| EP | 1657559 A1 | 5/2006 |
| GB | 2381607 A | 5/2003 |

| | | | |
|---|---|---|---|
| JP | 2005049326 A | 2/2005 |
| KR | 4042607 A | 11/2002 |
| WO | 9403820 A1 | 2/1994 |
| WO | 9422031 A1 | 9/1994 |
| WO | 9635250 A1 | 11/1996 |
| WO | 2006121496 A1 | 11/2006 |
| WO | 2007032944 A2 | 3/2007 |
| WO | 2007032944 A3 | 3/2007 |
| WO | 2007035488 A2 | 3/2007 |
| WO | 2007035488 A3 | 3/2007 |
| WO | 2007045976 A1 | 4/2007 |
| WO | 2007129213 A1 | 11/2007 |

OTHER PUBLICATIONS

Sultan, et al., "Detection of High Impedence Arcing Faults Using a Multi-Layer Perception"; *IEEE Transactions on Power Delivery*, vol. 7, No. 4, Oct. 1992, pp. 1871-1877.

Office action for parent U.S. Appl. No. 11/646,033 dated Dec. 15, 2008.

Al-Dabbagh et al.; "Improved microprocessor based distribution feeder earth fault protection using pattern recognition"; Proceedings of the Fourth International Conference on Development in Power Protection 1989; pp. 172-176.

Cristan et al.; "Multitaper Power Spectrum Estimation and Thresholding: Wavelet Packets Versus Wavelets"; IEEE Transactions on Signal Processing, vol. 50, No. 12, Dec. 2002; pp. 2976-2986.

Elkalashy; "Modeling and Detection of High Impedance Arcing Fault in Medium Voltage Networks"; TKK Dissertations 95, Espoo 2007.

Lai et al.; "Wavelet Transform Based Relay Algorithm for the Detection of Stochastic High Impedance Faults"; International Conference on Power Systems Transients—IPST 2003 in New Orleans, USA.

Leung; "Predictive Maintenance of Circuit Breakers"; University of Waterloo, Waterloo, Ontario, Canada, Waterloo, Ontario, Canada, 2007.

Sedighi et al.; "High impedance fault detection based on wavelet transform and statistical pattern recognition"; IEEE Transactions on Power Delivery, vol. 20, Issue 4, Oct. 2005; pp. 2414-2421.

Sultan et al.; "Detection of high impedance arcing faults using a multi-layer perception"; IEEE Transaction on Power Delivery, vol. 7, Issue 4, 1992; pp. 1871-1877.

Wen-Jun Li et al.; "Arc Fault Detection Based on Wavelet Packet"; Proceedings of the Fourth International Conference on Machine Learning and Cybernetics, Guangzhou, Aug. 18-21, 2005; 0-7803-909101/05; 2005 IEEE; pp. 1783-1788.

Kadivar, Ali, et al., "An Adaptive Auto Reclosure Scheme using Wavelet Transform," paper presented at Power Engineering Conference of Australasian Universities (AUPEC), Hobart, Tasmania, Sep. 25-28, 2005.

* cited by examiner

SERIES ARC FAULT INTERRUPTERS AND METHODS

CROSS REFERENCE TO RELATED APPLICATIONS

This application is a continuation of application Ser. No. 11/646,733 filed Dec. 28, 2006, which issued on Dec. 9, 2008 as U.S. Pat. No. 7,463,465.

BACKGROUND OF THE INVENTION

1. Field of the Invention

The present disclosure is related to alternating current (AC) electrical systems. More particularly, the present disclosure is related to series arc fault current interrupters and methods.

2. Description of Related Art

The electrical systems in residential, commercial, and industrial applications usually include a panel board for receiving electrical power from a utility source. The power is routed through the panel board to one or more current interrupters such as, but not limited to circuit breakers, trip units, and others.

Each current interrupter distributes the power to a designated branch, where each branch supplies one or more loads with the power. The current interrupters are configured to interrupt the power to the particular branch if certain power conditions in that branch reach a predetermined set point.

For example, some current interrupters can interrupt power due to a ground fault, and are commonly known as ground fault current interrupters (GFCI's). The ground fault condition results when an imbalance of current flows between a line conductor and a neutral conductor, which could be caused by a leakage current or an arcing fault to ground.

Other current interrupters can interrupt power due to an arcing fault, and are commonly known as arc fault current interrupters (AFCI's). Arcing faults are commonly defined into two main categories, series arcs and parallel arcs. Series arcs can occur, for example, when current passes across a gap in a single conductor. Parallel arcs can occur, for example, when current passes between two conductors.

Unfortunately, arcing faults may not cause a conventional circuit interrupter to trip. This is particularly true when a series arc occurs. Series arcing can potentially cause fires inside residential and commercial building. The potential for this to occur increases as homes become older.

Accordingly, it has been determined by the present disclosure that there is a continuing need for current interrupters and methods for detecting series arc faults in AC electrical systems that overcome, alleviate, and/or mitigate one or more of the aforementioned and other deleterious effects of prior art systems.

BRIEF SUMMARY OF THE INVENTION

A circuit interrupter for interrupting current on a line conductor is provided. The circuit interrupter includes separable contacts, a trip mechanism, a bimetal, a microprocessor, a series arc detection sequence, a low-pass filter circuit, and a high-pass filter circuit. The trip mechanism selectively opens the separable contacts when activated. The microprocessor is in electrical communication with the trip mechanism. The series arc detection sequence is resident on the microprocessor and includes a plurality of series fault detection algorithms. The low-pass filter circuit provides a low-pass signal from the bimetal to the series arc detection sequence. The high-pass filter circuit provides a high-pass signal from the bimetal to the series arc detection sequence. The sequence selects a particular algorithm from the plurality of algorithms based on the low-pass signal. The sequence calculates a plurality of statistical features from the high-pass signal and sends an output signal to activate the trip mechanism based on a comparison of the plurality of statistical features to the particular algorithm.

A method for detecting a series arc fault on a line conductor is also provided. The method includes sensing current across a bimetal in series with the line conductor, passing the current through a high-pass filter circuit to generate a high-pass signal, passing the current through a low-pass filter circuit to generate a low-pass signal, calculating a plurality of statistical features based on the high-pass signal, selecting a particular arc series algorithm from a plurality of algorithms based on the low-pass signal, and determining a trip command based on the plurality of statistical features and the particular arc series algorithm.

The present disclosure provides a circuit interrupter with series arcing detection by measuring the load current using the circuit interrupter's bimetal. The load current is filtered by a high-pass circuit and a low-pass circuit. The high-pass circuit removes the 60 Hz frequency content and the low-pass circuit removes high frequency signals, such as arcing. Data from the low-pass and high-pass circuit is sampled by a microprocessor. The sampled low-pass circuit is used to determine the root-mean-square (RMS) current level of the load. The sample high-pass circuit is analyzed using one or more statistical features. Once the statistical features are analyzed, the results of the features are compared to certain ranges depending on the RMS current level. If features fall between the predefine ranges at a particular RMS current level, then a counter is incremented. If the counter reaches a predefined value, the processor fires the circuit interrupter's trip mechanism. If the features do not fall between the range, the counter is decremented. The counter stops decreasing once it reaches a default value.

The above-described and other features and advantages of the present disclosure will be appreciated and understood by those skilled in the art from the following detailed description, drawings, and appended claims.

DETAILED DESCRIPTION OF THE INVENTION

Figure 1:
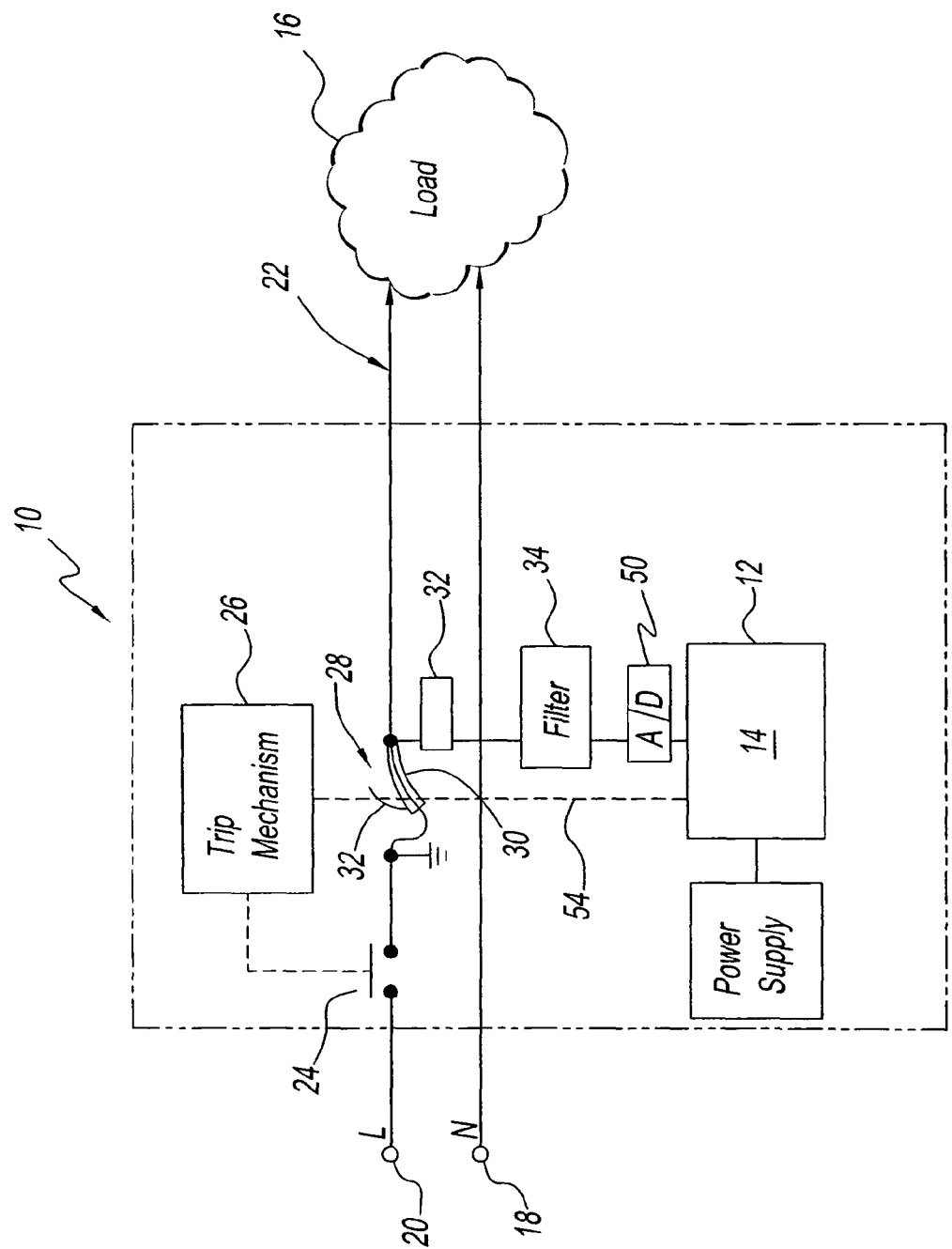
FIG. 1 is an schematic depiction of an exemplary embodiment of arc fault current interrupter according to the present disclosure.

Referring to the drawings and in particular to FIG. 1, an exemplary embodiment of an arc fault current interrupter (AFCI) according to the present disclosure is shown and is generally referred to by reference numeral 10. AFCI 10 includes a microprocessor 12 having a series arc detection sequence 14 resident thereon.

Advantageously, sequence 14 uses a statistical approach to series arc detection. Sequence 14 processes one or more signal features that can identify characteristics of the signal. Sequence 14 then calculates a plurality of characteristic statistical features from the signals. Based on one or more of the characteristic statistical features, sequence 14 executes a particular decision tree to determine the presence of series arc faults.

AFCI 10 is configured to place in a load 16 in electrical communication with a neutral conductor 18 and a line conductor 20 across a branch circuit 22. AFCI 10, via sequence 14, is configured to selectively open separable contacts 24 across line conductor 20 upon detection of a series arc fault. In this manner, AFCI 10 is adapted to detect series arcing in branch circuit 22 and to interrupt power to the branch circuit.

Contacts 24 are opened by a trip mechanism 26 in a known manner. For example, contacts 24 can be opened by a spring loaded trip mechanism (not shown) as is known in the art.

In addition to being activated by sequence 14, trip mechanism 26 can also be actuated by a conventional thermal-magnetic overcurrent device 28 having a bimetal 30 connected in series with line conductor 20. For example, bimetal 30 can bend in a known manner upon application of an overcurrent to the bimetal, which results in activation of trip mechanism 26. Additionally, bimetal 30 can include a magnetically actuated armature 32, which can activate trip mechanism 26 upon application of short circuits across the bimetal.

In some embodiments, AFCI 10 can include a conventional parallel arc detector 32. Parallel arc detector 32 is configured to activate trip mechanism 26 upon detection of parallel arcs across line conductor 20. Thus, sequence 14 of the present disclosure can work in parallel with the existing AFCI parallel arc detection or separate from the existing AFCI detection.

In this manner, AFCI 10 combines overcurrent device 28, which provides overcurrent and short protection, parallel arc detector 32, which provides parallel arc protection, and sequence 14, which provides series arc protection.

Figure 2:
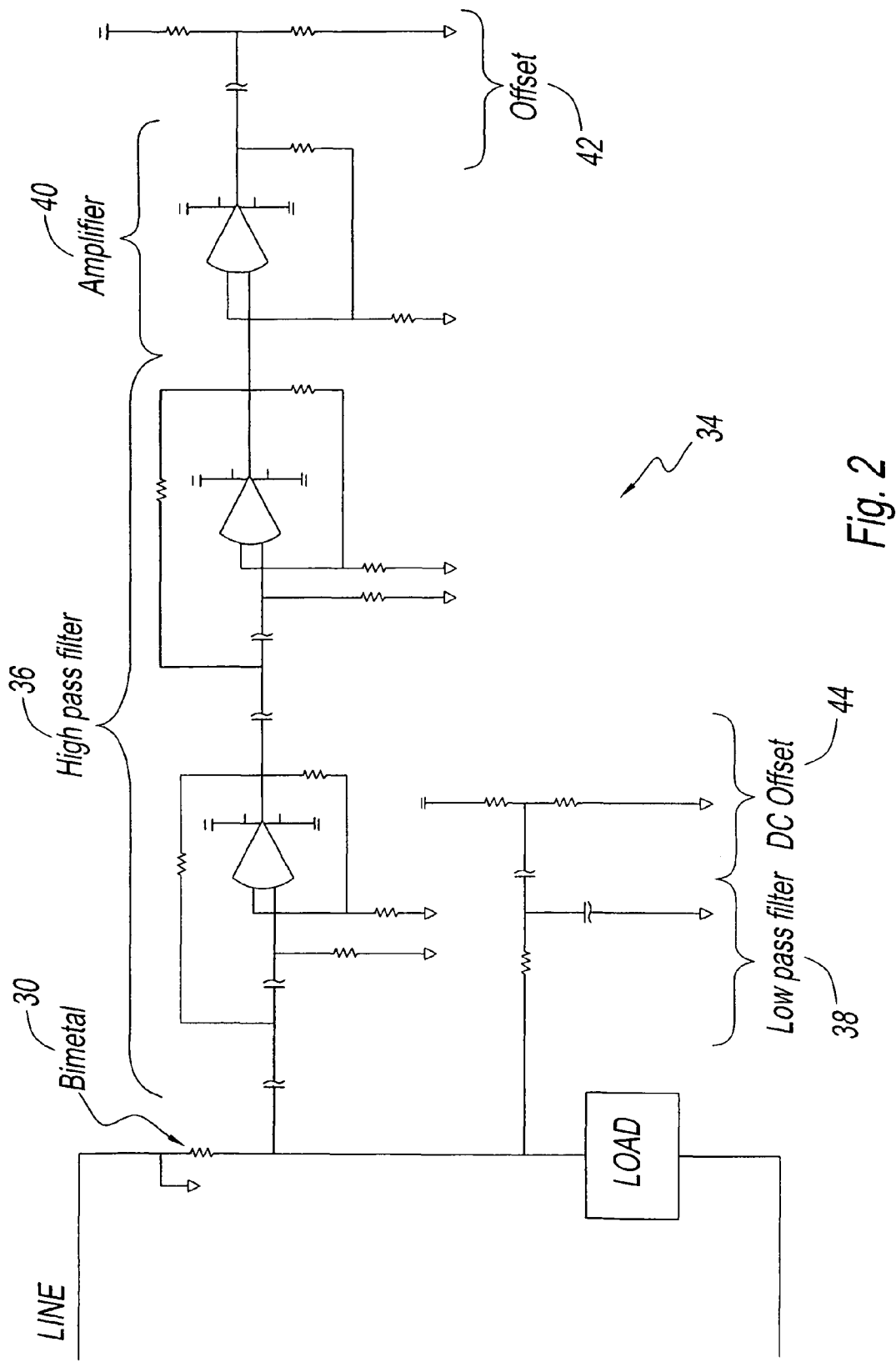
FIG. 2 is a circuit diagram of an exemplary embodiment of a two-channel bandpass filter circuit according to the present disclosure for use with the arc fault current interrupter of FIG. 1.
Figure 3:
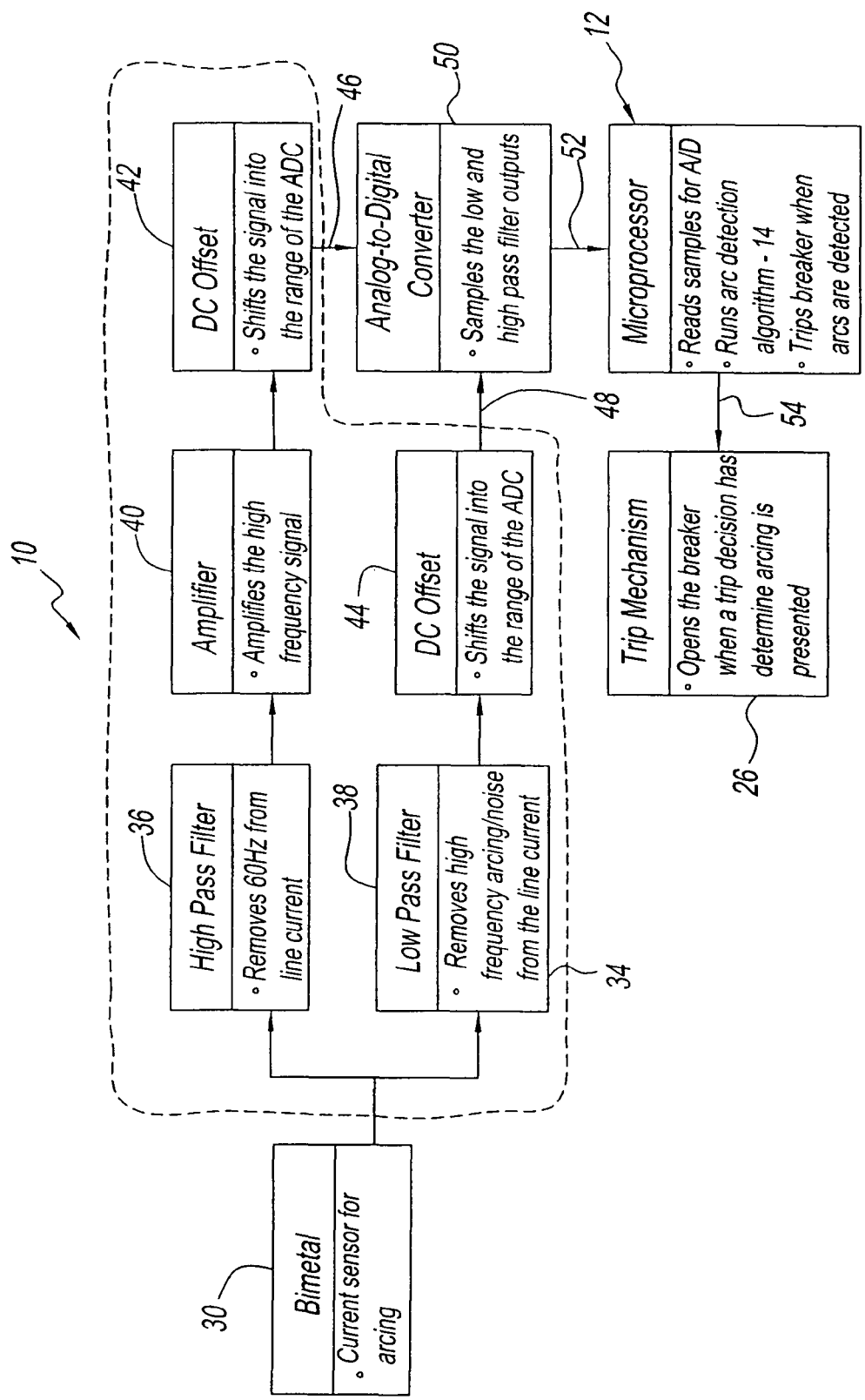
FIG. 3 is a functional block diagram of the arc fault current interrupter of FIG. 1.

AFCI 10 includes a two-stage bandpass filter circuit 34 for detecting sensed voltage across bimetal 30. Circuit 34 is described in more detail with reference to FIGS. 2 and 3. Circuit 34 includes a high-pass filter 36, a low-pass filter 38, an amplifier 40, a first DC offset 42, and a second DC offset 44. Circuit 34 is configured to generate a high-pass signal 46 and a low-pass signal 48, which are provided to an analog-to-digital (A/D) converter 50.

High-pass filter 36 is configured to remove line current on line conductor 20 at a predetermined frequency. In the illustrated embodiment, filter 36 is configured to remove line current at 60 Hertz (Hz). The line current from filter 36 is amplified by amplifier 40 to a high frequency signal, which is then shifted by first DC offset 42 to the predetermined frequency range of A/D converter 50.

Low-pass filter 38 is configured to remove high frequency arcing and noise from the current on line conductor 20. The high frequency signal from filter 38 is amplified shifted by second DC offset 44 to the predetermined frequency range of A/D converter 50.

As such, high-pass filter 36 provides signal 46 to A/D converter 50, while low-pass filter 38 provides low-pass signal 48 to A/D converter 50. Converter 50 samples the high and low-pass signals 46, 48 and provides samples 52 to microprocessor 12.

Microprocessor 12 reads samples 52 and runs these samples through sequence 14. When sequence 14 determines that a series arc is present, microprocessor 12 sends an output signal 54 to trip mechanism 26 to open contacts 24.

Sequence 14 is described in detail with reference to FIGS. 4 through 7.

Broadly stated, sequence 14 calculates the root mean square (RMS) of low-pass signal 48 and calculates a plurality of statistical features from both high and low-pass signals 46, 48. Based on the RMS level of low-pass signal 48, sequence 14 executes a particular decision tree from a number of decision trees. Each decision tree uses one or more of the statistical features to determine if a series arc fault is present.

Figure 4:
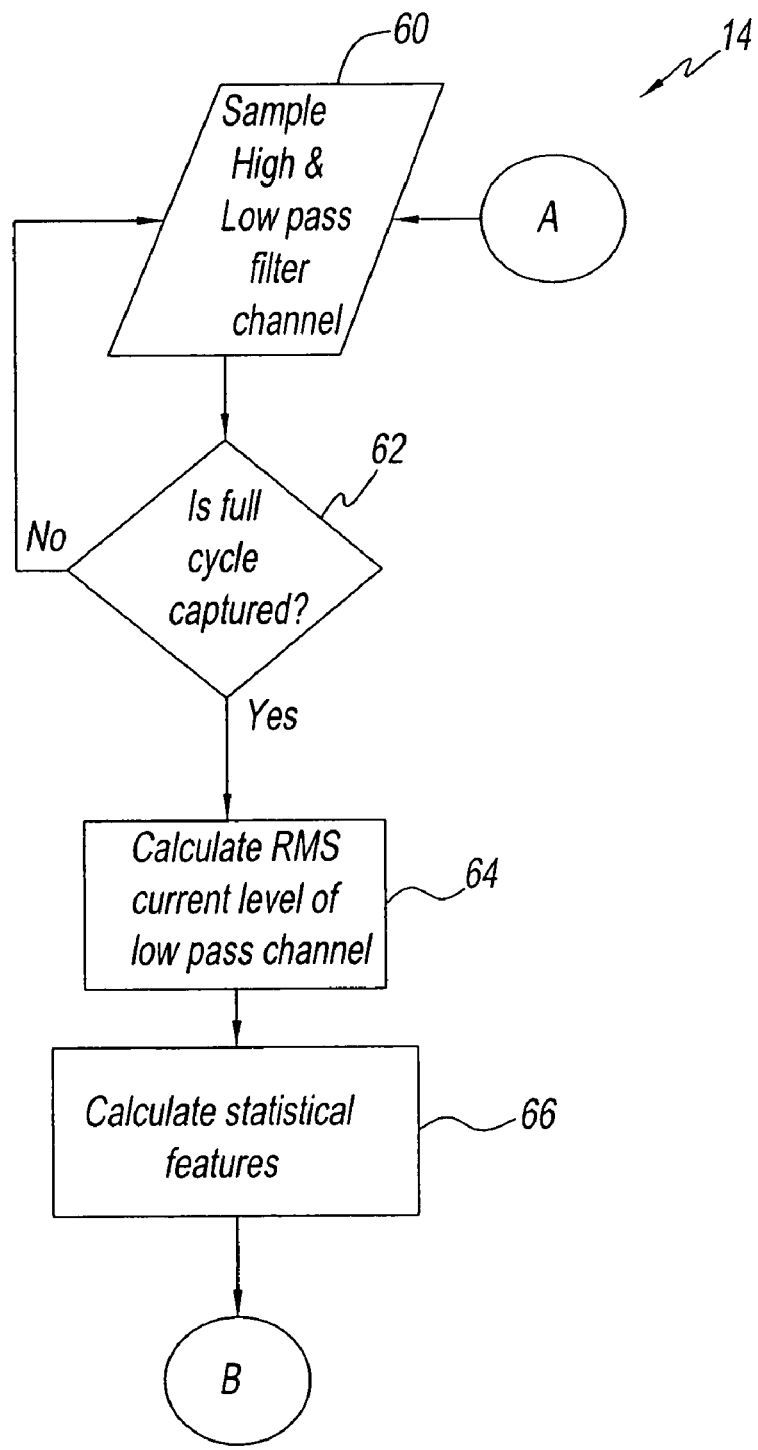
FIGS. 4 through 7 illustrate an exemplary embodiment of a series arc detection sequence resident on the arc fault current interrupter of FIG. 1.

As seen in FIG. 4, sequence 14 begins with a sampling step 60, where the sequence samples the low and high-pass filter channels for signals 46, 48. After obtaining the samples, sequence 14 determines whether the samples captured are from a complete cycle at a cycle determination step 62. If sequence 14 determines at step 62 that a complete cycle was not captured, then the sequence repeats sampling step 60. However, if sequence 14 determines at step 62 that a complete cycle was captured, then the sequence continues to one or more calculation steps 64, 66.

During first calculation step 64, sequence 14 determines the RMS current level of low-pass signal 48.

During second calculation step 66, sequence 14 determines a plurality of statistical features from high and low-pass signals 46, 48. For example, it is contemplated by the present disclosure for sequence 14 to control microprocessor 12 to calculate for both the high and low-pass signals 46, 48 statistical features such as, but not limited to, the mean of the full cycle, the standard deviation of the full cycle, the maximum standard deviation of any window in the cycle, the minimum standard deviation of any window in the cycle, the ratio of the maximum and minimum standard deviations, the absolute sum of each sample in the cycle, the relation of the standard deviations (or variances) for each adjacent window in the cycle, the RMS value, and others.

It is contemplated by the present disclosure for sequence 14 to control microprocessor 12 to calculate for both the high and low-pass signals 46, 48 the difference between each adjacent point for features such as, but not limited to, the maximum difference between two adjacent samples, the minimum difference between two adjacent samples, the ratio of the maximum difference to the minimum difference, the range of the differences (e.g., the maximum difference minus the minimum difference), the sum of the differences between adjacent points, and others.

It is contemplated by the present disclosure for sequence 14 to control microprocessor 12 to calculate for both the high and low-pass signals 46, 48, based on a second difference signal, the difference between adjacent points in the above mentioned first difference signal, statistical features such as, but not limited to, the maximum difference between two adjacent samples, the minimum difference between two adjacent samples, the ratio of the maximum difference to the minimum difference, the range of the differences (e.g., the maximum difference minus the minimum difference), the sum of the differences between adjacent points, and others.

Sequence 14 controls microprocessor 12 to calculate the additional statistical features based on low-pass signal 48, which has been digitally filtered by a 10-pole rectangular band-pass digital filter from between about 700 to about 3000 Hz. In a preferred embodiment, the 10-pole rectangular band-pass digital filter is resident on microprocessor 12. The additional statistical features can include the calculation of features such as, but not limited to, the standard deviation (or variance) of the difference between adjacent points in a cycle, an approximation of the standard deviation (or variance) of the difference between adjacent points in a cycle by allowing overflow of the processor's registers, the mean of the difference between adjacent points.

Sequence 14 controls microprocessor 12 to calculate, based on low-pass signal 48, the change in RMS from the previous captured cycle and the RMS of the latest cycle.

Sequence 14 controls microprocessor 12 to calculate one or more peak counting features. For example, microprocessor 12 can calculate the number of distinct peaks in the high-pass signal 46 that occur while the low-pass signal 48 is negative. As used herein, a distinct peak is identified if the magnitude of the point in question is further from the mean of the entire cycle than one standard deviation. Points that are within close proximity of each other that are all above or below one standard deviation from the mean are considered one peak. As such, sequence 14 controls microprocessor 12 to calculate the number of peaks in high-pass signal 46 that are below a first threshold and the number of peaks in high-pass signal 46 that are above a second threshold or below a third threshold. In an exemplary embodiment, the second and third thresholds are equidistant from the mean of the cycle.

Figure 5:
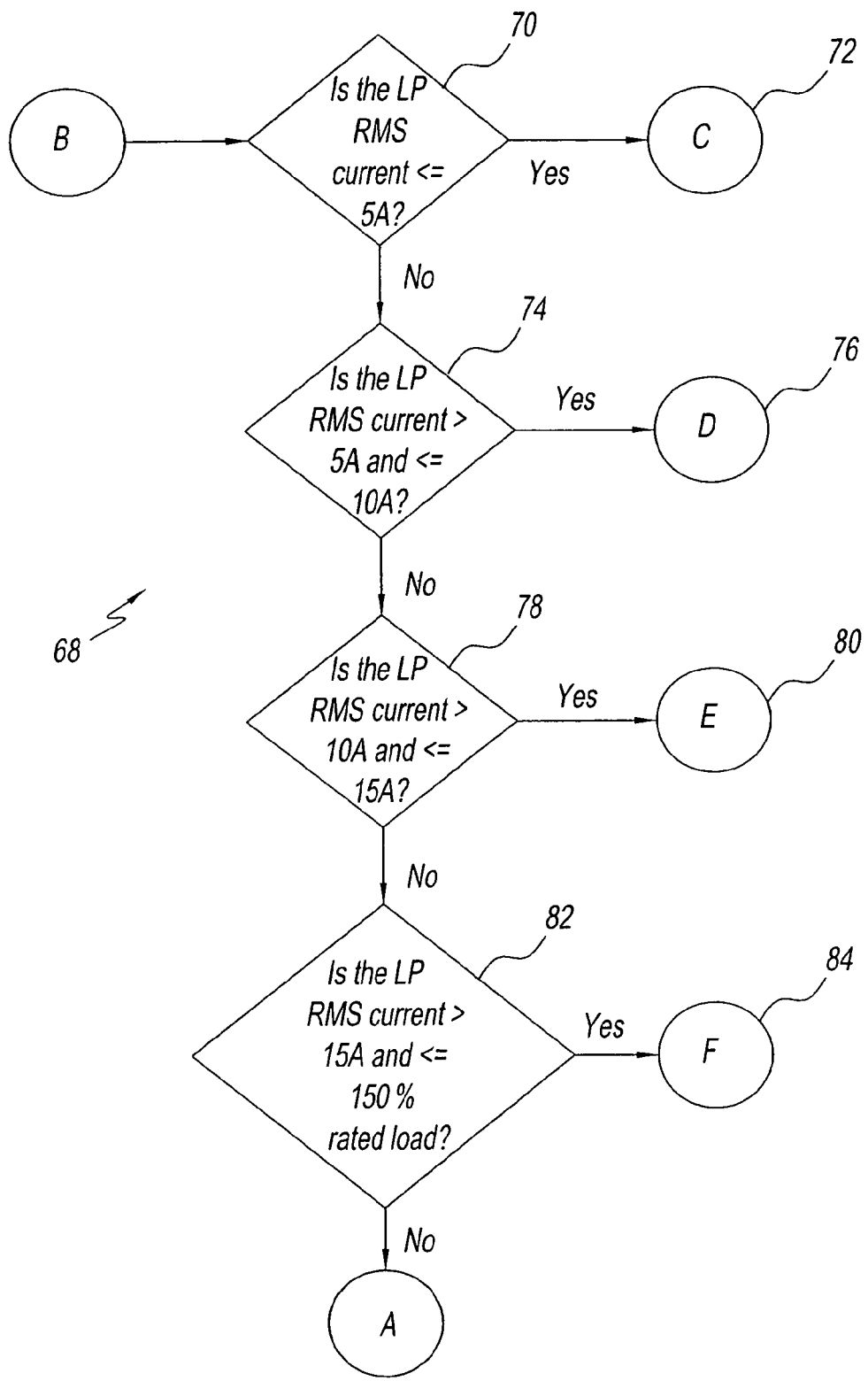

Once sequence 14 includes all necessary statistical features from calculation steps 64 and 66, the sequence performs an algorithm selection step 68 illustrated in FIG. 5. During selection step 68, sequence 14 determines, based on the RMS value of low-pass signal 48, which series arc fault algorithm from a plurality of algorithms to execute.

In the illustrated embodiment, selection step 68 executes, at a first decision node 70, a first algorithm 72 if the RMS value of low-pass signal 48 is less than or equal to 5 amps. Selection step 68 implements, at a second decision node 74, a second algorithm 76 if the RMS value of low-pass signal 48 is greater than 5 amps and less than or equal to 10 amps. Selection step 68 implements, at a third decision node 78, a third algorithm 80 if the RMS value of low-pass signal 48 is greater than 10 amps and less than or equal to 15 amps. Selection step 68 implements, at a fourth decision node 82, a fourth algorithm 84 if the RMS value of low-pass signal 48 is greater than 15 amps and is greater than 150% of the rated load of circuit interrupter 10. If selection step 68 determines that none of the decision node conditions is met, then sequence 14 returns to sampling step 60.

Advantageously, sequence 14, via selection step 68, applies a different series arc fault algorithm 72, 76, 80, or 84 based upon the RMS current level of low-pass signal 48. It should be recognized that the present disclosure is described by way of example only as having four algorithms 72, 76, 80, and 84. Of course, it is contemplated by the present disclosure for sequence 14 to include any plurality of algorithms that include more or less than four algorithms.

Figure 6:
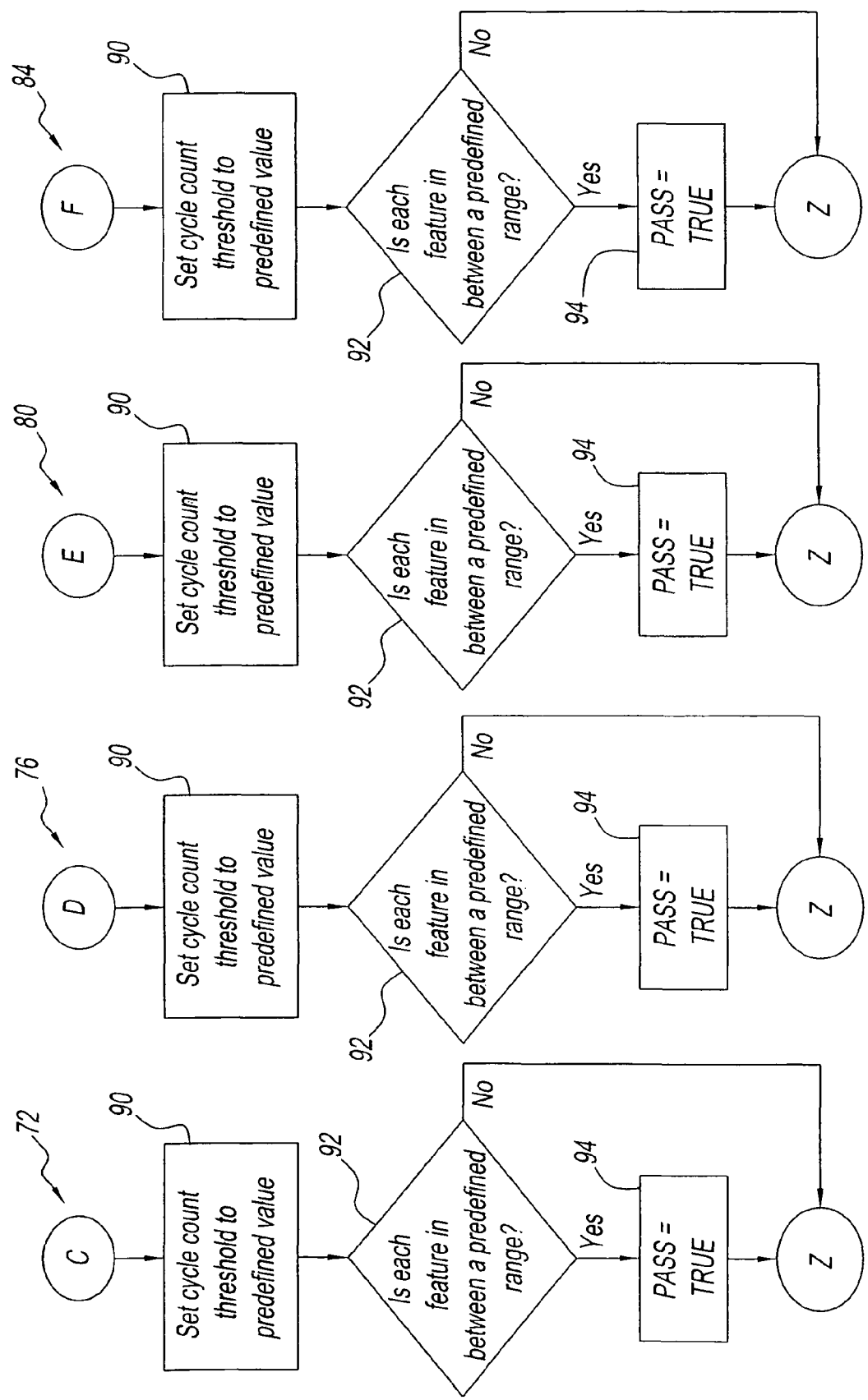
Figure 7:
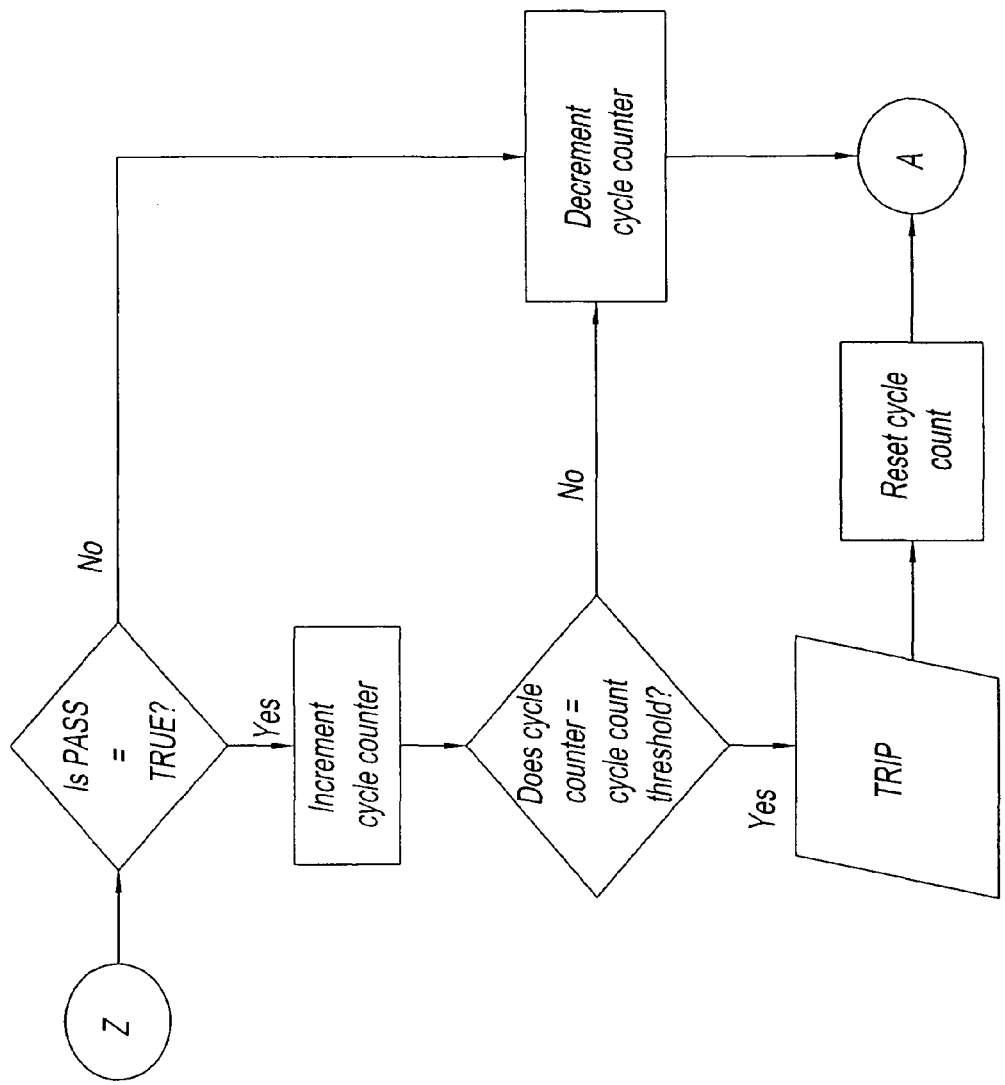

Exemplary embodiments of algorithms 72, 76, 80, and 84 are illustrated in FIG. 6. In the illustrated embodiment, each algorithm includes the same steps, namely a cycle count reset step 90, a feature to range comparison step 92, and a set pass step 94. While the steps in each algorithm 72, 76, 80, and 84 are essentially the same, the values within cycle count reset step 90 and feature to range comparison step 92 are different for each algorithm.

An exemplary embodiment of series arc fault algorithm 72 for use when the RMS value of low-pass signal 48 is less than or equal to 5 amps is provided below.

EXAMPLE

5 Amp Series Arc Detection Algorithm 72

IF ((RatioMaxMinSTDx>=88) AND (MaxSTDx>=400) AND
(STDSequence>0) AND (Delta_RMS<20)), THEN
CountThreshold=2;
PASS=TRUE;
IF ((MinSTDx>=2) AND (MinSTDx<40) AND (stdfullx>=45) AND
(F_RMS>=459) AND (SecondDiffMaxx<148) AND (Delta_RMS<8)
AND (FirstDiffSumx<8)), THEN
CountThreshold=2;
PASS=TRUE;
IF ((MinSTDx<34) AND (stdfullx>=56) AND (FirstDiffSumx<15) AND
(F_RMS>=163) AND (MinSTDx<227) AND (SecondDiffMaxx>=151)
AND (MinSTDx>0) AND (STDSequence>0) AND (Delta_RMS<10)
AND (SecondDiffMaxx<195)), THEN
CountThreshold=2;
PASS=TRUE;
IF ((stdfullx>=2000) AND (MaxSTDx>=3000) AND (MinSTD>300)),
THEN
CountThreshold=2;
PASS=TRUE;
IF ((RMS_ORG>25) AND (stdfullx>=195) AND (meanfullx>=502) AND
(Delta_RMS<5) AND (MinSTDx>=126) AND (MinSTDx<281) AND
(MaxSTDx>=350)), THEN
CountThreshold=2;
PASS=TRUE;
IF ((RMS_ORG>25) AND (stdfullx>=195) AND (Delta_RMS<5)),
THEN
CountThreshold=2;
PASS=TRUE;
IF ((RatioMaxMinSTDx>20) AND (RatioMaxMinSTDx<500) AND
(MinSTDx>=4) AND (SecondDiffMaxx<283)), THEN
CountThreshold=2;
PASS=TRUE;
IF ((DimmerPeakCount>50) AND (RMS_ORG>25) AND
(Delta_RMS<16)), THEN
CountThreshold=2;
PASS=TRUE;
If ((DimmerPeakCount>50) AND (RMS_ORG>14) AND
(MinSTDx<215)),
THEN
CountThreshold=2;
PASS=TRUE;

As can be seen from the above example, algorithm 72 provides a series of "IF" condition "THEN" statements. Where the IF condition is a particular feature calculated by microprocessor 12 from high and low-pass signals 46, 48. When the particular condition is true, then algorithm 72 sends a TRIP (i.e., output signal 54) to trip mechanism 26 to open contacts 24.

An exemplary embodiment of series arc fault algorithm 76 for use when the RMS value of low-pass signal 48 is greater than 5 amps and less than or equal to 10 amps is provided below.

EXAMPLE

10 Amp Series Arc Detection Algorithm 76

IF ((RMS_ORG>55) AND (RatioMaxMinSTDx>=88) AND
(MaxSTDx>=700) AND (STDSequence>0) AND (Delta_RMS<25)),
THEN
CountThreshold=2;
PASS=TRUE;
IF ((DimmerPeakCount>60) AND (RMS_ORG>90) AND
(AbsSumx>=378609) AND (MinSTDx<53) AND (stdfullx>20)), THEN -continued

```
CountThreshold=2;
PASS=TRUE;
IF ((DimmerPeakCount>60) AND (RMS_ORG<55) AND (stdfullx>20)),
THEN
CountThreshold=2;
PASS=TRUE;
IF ((DimmerPeakCount>60) AND (55<RMS_ORG<75) AND
(MinSTDx>=20) AND (FirstDiffMinx>=-551)), THEN
CountThreshold=2;
PASS=TRUE;
IF ((DimmerPeakCount>60) AND (RMS_ORG>=65) AND
(RMS_ORG<100) AND (stdfullx>20)), THEN
CountThreshold=3;
PASS=TRUE;
IF ((PeakCount<15) AND (RMS_ORG>=86) AND (stdfullx>20)), THEN
CountThreshold=3;
PASS=TRUE;
IF ((MaxSTDx<2727) AND (RatioMaxMinSTDx<16) AND
(SecondDiffMaxx>=929)), THEN
CountThreshold=1;
PASS=TRUE;
IF ((RMS_ORG>55) AND (RMS_ORG<80) AND
(RatioMaxMinSTDx>=100) AND (stdfullx>800) AND
(Delta_RMS<25)), THEN
CountThreshold=2;
PASS=TRUE;
IF ((RMS_ORG>40) AND (RMS_ORG<60) AND (stdfullx>=318) AND
(MinSTDx<158) AND (Delta_RMS<10)), THEN
CountThreshold=1;
PASS=TRUE;
IF ((RMS_ORG<79) AND (MinSTDx<131) AND (MinSTDx>=3) AND
(stdfullx>=46) AND ((FirstDiffRatiox<-.7048611) OR
((FirstDiffRatiox>=-.7048611) AND (MinSTDx<52)))) , THEN
CountThreshold=3;
PASS=TRUE;
IF ((RMS_ORG<79) AND (3<=MinSTDx<131) AND (stdfullx>=46)
AND ((FirstDiffRatiox<-.7048611) OR ((FirstDiffRatiox>=-.7048611)
AND (MinSTDx<52)))) , THEN
CountThreshold=3;
PASS=TRUE;
IF ((DimmerPeakCount>50) AND (stdfullx>50) AND (RMS_ORG<70)
AND (RMS_ORG>45) AND (Delta_RMS<30)) , THEN
CountThreshold=2;
PASS=TRUE;
IF ((DimmerPeakCount>50) AND (RMS_ORG<=45) AND
(Delta_RMS<16)), THEN
CountThreshold=2;
PASS=TRUE;
IF ((RMS_ORG<70) AND (stdfullx>=781) AND (meanfullx>=500) AND
(MaxSTDx>=1996)), THEN
CountThreshold=2;
PASS=TRUE.
```

EXAMPLE

15 A Series Arc Detection Algorithm 80

```
IF ((FullPeakCount<200) AND (stdfullx>=1300) AND
(MaxSTDx>=2363) AND (Delta_RMS<50)), THEN
CountThreshold=1;
PASS=TRUE;
IF ((PeakCount<12) AND (SecondDiffSumx<117) AND
(MaxSTDx>1000)),
THEN
CountThreshold=1;
PASS=TRUE;
IF ((MinSTDx<61) AND (FirstDiffMinx<-259) AND (FirstDiffSumx>=9)
AND (MaxSTDx>=286)), THEN
CountThreshold=1;
PASS=TRUE;
IF ((RMS_ORG>170) AND (MaxSTDx>=1000) AND (MinSTDx<155)
AND (Delta_RMS<20)), THEN
```

-continued

```
CountThreshold=1;
PASS=TRUE;
If ((RMS_ORG>170) AND (SecondDiffMaxx>=347) AND
(stdfullx<148)) ,
THEN
CountThreshold=1;
PASS=TRUE.
```

EXAMPLE

150% Rated Current Series Arc Detection Algorithm 84

```
IF ((MaxSTDx>400) AND (Delta_RMS<40)), THEN
CountThreshold=1;
PASS=TRUE.
```

Thus, algorithms 76, 80, 84 also provide a series of "IF" condition "THEN" statements. Where the IF condition is a particular feature calculated by microprocessor 12 from high and low-pass signals 46, 48. When the particular condition is true, then the algorithm 14 sets PASS=TRUE and a cycle counter is incremented. The algorithm compares the cycle counter to the count threshold, which is set when PASS=TRUE. If the cycle counter is greater than or equal to the count threshold, algorithm 14 sends a TRIP (i.e., output signal 54) to trip mechanism 26 to open contacts 24.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A circuit interrupter for interrupting current on a line conductor, comprising:
    separable contacts in electrical communication with the line conductor;
    a trip mechanism for selectively opening said separable contacts upon receipt of a trip signal;
    a sensor in electrical communication with the line conductor;
    a processing device in electrical communication with said trip mechanism;
    a series arc detection sequence resident on said processing device, said series arc detection sequence comprising a plurality of series fault detection algorithms; and
    at least one filter circuit comprising a low-pass filter providing at least one signal from said sensor to said series arc detection sequence, said sequence selecting a particular algorithm from said plurality of algorithms based on said at least one signal, calculating a plurality of statistical features from said at least one signal, and generating said trip signal based on a comparison of said plurality of statistical features to said particular algorithm, wherein said low-pass filter circuit is configured to provide a low-pass signal from said sensor to said series arc detection sequence, said sequence selecting said particular algorithm from said plurality of algorithms based on said low-pass signal.

2. The circuit interrupter as in claim 1, wherein said sensor comprises a bimetal connected in series with the line conductor.

3. The circuit interrupter as in claim 1, further comprising a parallel arc detector in electrical communication with the line conductor, said parallel arc detector generating said trip signal upon detection of a parallel arc across the line conductor.

4. The circuit interrupter as in claim 1, wherein said trip mechanism opens said separable contacts upon application of an overcurrent across said sensor and/or upon application of a short circuit across said sensor.

5. The circuit interrupter as in claim 4, further comprising a parallel arc detector in electrical communication with the line conductor, said parallel arc detector generating said trip signal upon detection of a parallel arc across the line conductor.

6. The circuit interrupter as in claim 1, further comprising an analog-to-digital converter for sampling said low-pass signal from said low-pass filter circuit.

7. The circuit interrupter as in claim 1, wherein said low-pass filter circuit further comprises a DC offset.

8. A circuit interrupter for interrupting current on a line conductor, comprising:
   separable contacts in electrical communication with the line conductor;
   a trip mechanism for selectively opening said separable contacts upon receipt of a trip signal;
   a sensor in electrical communication with the line conductor;
   a processing device in electrical communication with said trip mechanism;
   a series arc detection sequence resident on said processing device, said series arc detection sequence comprising a plurality of series fault detection algorithms; and
   at least one filter circuit comprising a high-pass filter providing at least one signal from said sensor to said series arc detection sequence, said sequence selecting a particular algorithm from said plurality of algorithms based on said at least one signal, calculating a plurality of statistical features from said at least one signal, and generating said trip signal based on a comparison of said plurality of statistical features to said particular algorithm, wherein said high-pass filter circuit provides a high-pass signal from said sensor to said series arc detection sequence, said sequence calculating said plurality of statistical features from said high-pass signal.

9. The circuit interrupter as in claim 8, further comprising an analog-to-digital converter for sampling said high-pass signal from said high-pass filter circuit.

10. The circuit interrupter as in claim 8, wherein said high-pass filter circuit further comprises an amplifier and a DC offset.

11. The circuit interrupter as in claim 8, wherein said sensor comprises a bimetal connected in series with the line conductor.

12. The circuit interrupter as in claim 8, further comprising a parallel arc detector in electrical communication with the line conductor, said parallel arc detector generating said trip signal upon detection of a parallel arc across the line conductor.

13. The circuit interrupter as in claim 8, wherein said trip mechanism opens said separable contacts upon application of an overcurrent across said sensor and/or upon application of a short circuit across said sensor.

14. The circuit interrupter as in claim 13, further comprising a parallel arc detector in electrical communication with the line conductor, said parallel arc detector generating said trip signal upon detection of a parallel arc across the line conductor.

15. A circuit interrupter for interrupting current on a line conductor, comprising:
   separable contacts in electrical communication with the line conductor;
   a trip mechanism for selectively opening said separable contacts upon receipt of a trip signal;
   a sensor in electrical communication with the line conductor;
   a processing device in electrical communication with said trip mechanism;
   a series arc detection sequence resident on said processing device, said series arc detection sequence comprising a plurality of series fault detection algorithms;
   a low-pass filter circuit in electrical communication with said sensor, said low-pass filter circuit passing a low-pass signal from said sensor to said series arc detection sequence, said sequence selecting a particular algorithm from said plurality of algorithms based on said low-pass signal; and
   a high-pass filter circuit in electrical communication with said sensor, said high-pass filter circuit passing a high-pass signal from said sensor to said series arc detection sequence, said sequence calculating a plurality of statistical features from said high-pass signal and generating said trip signal based on a comparison of said plurality of statistical features to said particular algorithm.

16. The circuit interrupter as in claim 15, further comprising a parallel arc detector in electrical communication with the line conductor, said parallel arc detector generating said trip signal upon detection of a parallel arc across the line conductor.

17. The circuit interrupter as in claim 15, wherein said sensor comprises a bimetal connected in series with the line conductor.

18. The circuit interrupter as in claim 16, wherein said trip mechanism opens said separable contacts upon application of an overcurrent across said bimetal and/or upon application of a short circuit across said bimetal.

19. The circuit interrupter as in claim 18, further comprising a parallel arc detector in electrical communication with the line conductor, said parallel arc detector generating said trip signal upon detection of a parallel arc across the line conductor.

* * * * *